(12) United States Patent
Sorola et al.

(10) Patent No.: US 8,925,347 B2
(45) Date of Patent: Jan. 6, 2015

(54) RECHARGEABLE, PORTABLE, MISTING BEVERAGE SYSTEM

(75) Inventors: Benny D. Sorola, San Antonio, TX (US); Ernest H. Sorola, San Antonio, TX (US)

(73) Assignee: Sorola, LLC, San Antonio, TX (US)

( * ) Notice: Subject to any disclaimer, the term of this patent is extended or adjusted under 35 U.S.C. 154(b) by 353 days.

(21) Appl. No.: 13/495,660

(22) Filed: Jun. 13, 2012

(65) Prior Publication Data

US 2012/0319309 A1 Dec. 20, 2012

Related U.S. Application Data

(60) Provisional application No. 61/497,360, filed on Jun. 15, 2011.

(51) Int. Cl.
*F25D 3/08* (2006.01)
*B01D 47/00* (2006.01)
*F24F 5/00* (2006.01)

(52) U.S. Cl.
CPC ... *B01D 47/00* (2013.01); *F25D 3/08* (2013.01); *F24F 5/0035* (2013.01); *F24F 2221/12* (2013.01); *Y02B 30/545* (2013.01)
USPC ............ 62/457.7; 62/312; 62/398; 62/304; 261/28

(58) Field of Classification Search
CPC ..................................... F25D 3/06; F25D 3/08
USPC ............. 62/304, 312, 398, 420, 425; 261/28, 261/78.2
See application file for complete search history.

(56) References Cited

U.S. PATENT DOCUMENTS

| | | | |
|---|---|---|---|
| 2,198,822 A | 4/1940 | Karge | |
| 5,979,793 A * | 11/1999 | Louis | 239/128 |
| 6,367,540 B1 | 4/2002 | Elliott | |
| 6,463,756 B1 * | 10/2002 | Lewis | 62/457.7 |
| 7,188,489 B2 | 3/2007 | Martello | |
| 2004/0069009 A1 * | 4/2004 | Tedder | 62/457.7 |
| 2008/0169575 A1 | 7/2008 | Chen et al. | |
| 2008/0178629 A1 | 7/2008 | Meether | |
| 2008/0184725 A1 | 8/2008 | Leitner | |

* cited by examiner

*Primary Examiner* — Cassey D Bauer
(74) *Attorney, Agent, or Firm* — Lathrop & Gage LLP

(57) ABSTRACT

A misting system utilizing spent ice comprises a portable housing and an inner frame. The inner frame is secured inside the housing and is configured to receive ice and at least one of food and beverage. The inner frame has an outlet for passing the melted ice. A lid is provided for selectively enclosing the inner frame. The system includes a pump. The pump is inside the portable housing, and is in communication with the inner frame outlet and an outlet of the portable housing. The pump is configured to pump melted ice from the inner frame to the outlet of the portable housing for use as mist.

12 Claims, 12 Drawing Sheets

RECHARGEABLE, PORTABLE, MISTING BEVERAGE SYSTEM

CROSS-REFERENCE TO RELATED APPLICATIONS

This applications claims priority to U.S. Provisional Patent Application No. 61/497,360 filed Jun. 15, 2011, the disclosure of which is incorporated herein in its entirety by reference.

BACKGROUND

In many parts of the United States, daytime temperatures can extend well over 80° Fahrenheit. People generally consider temperatures over 80° Fahrenheit to be uncomfortable, and temperatures over 80° Fahrenheit are often regarded as being dangerous.

To address this heat, various cooling devices and methods have been devised. For example, evaporative cooling places liquid vapor-typically water vapor—in the air to cool an ambient area. Evaporation, the process whereby a liquid is converted from its liquid to vapor form, is an endothermic (i.e., a heat absorbing) process. This is because energy is required to break the stronger bonds between the molecules of a liquid, so as to allow them to break free in gaseous form. During evaporation, the liquid may absorb this energy from the surrounding air, which, consequently, gets cooled. This cooling effect is known as evaporative cooling.

Misters operate under the principle of evaporate cooling. Specifically, misters operate by forcing into their surroundings fine droplets of water (i.e., mist) through small nozzles at high pressure. These fine droplets of water generally evaporate into their surroundings before they reach the ground, and in so doing, absorb heat from the surrounding air. The surrounding air, in turn, gets desirably cooled. The present invention relates generally to the field of portable misting systems.

SUMMARY

Systems and methods for recycling spent ice from coolers are disclosed herein. According to one embodiment, a system for recycling spent ice from a cooler by misting comprises a portable frame. The system includes an inlet that is configured to receive the spent ice. A pump is housed inside the frame. The pump is in communication with the inlet for pumping the spent ice to a mist outlet.

According to another embodiment, a misting system utilizing spent ice comprises a portable housing and an inner frame. The inner frame is secured inside the housing and is configured to receive ice and at least one of food and beverage. The inner frame has an outlet for passing the melted ice. A lid is provided for selectively enclosing the inner frame. The system includes a pump. The pump is inside the portable housing, and is in communication with the inner frame outlet and an outlet of the portable housing. The pump is configured to pump melted ice from the inner frame to the outlet of the portable housing for use as mist.

According to yet another embodiment, a method for using a misting system comprises the step of accessing a system having a portable housing. An inner frame is secured inside the housing. The inner frame is configured to receive ice and at least one of food and beverage. The inner frame has an outlet for passing melted ice. The inner frame includes a lid for selectively enclosing the inner frame. A pump is provided inside the portable housing. The pump is in communication with the inner frame outlet and an outlet of the portable housing to pump melted ice from the inner frame to the portable housing outlet for use as mist. The method further includes a step of placing ice and at least one of food and beverage in the inner frame, and a step of allowing at least a portion of the ice in inner frame to melt. The method includes a step for actuating the pump to output at least a portion of the melted ice to the portable housing outlet for use as mist.

BRIEF DESCRIPTION OF THE SEVERAL VIEWS OF THE DRAWINGS

Illustrative embodiments of the present invention are described in detail below with reference to the attached drawing figures and wherein.

DETAILED DESCRIPTION

Embodiments of the present invention provide systems and methods for cooling the environment around a user by misting.

Misting systems are gaining popularity as alternatives to cooling systems such as fans and air conditioners. This is in part because misters are more effective at cooling the environment than fans, and because misters are generally cheaper and environmentally friendlier as compared to air conditioners. Portability of misting systems, however, is a problem. Specifically, to operate, misting systems require as inputs both a source of water and electrical power. And, at outdoor events or gatherings (e.g., picnics, tail gaiting events, camping, et cetera), one or both of these inputs may not be easily available.

Portable coolers for keeping food and beverages at desirably low temperatures, on the other hand, are a common sight at outdoor gatherings. Portable coolers include insulated chambers for housing food and beverages along with ice. The insulated chambers prevent the ice from melting quickly, and the ice may keep the contents of the coolers at low temperatures. Over time, however, the ice in the coolers melts and turns to water. This water is normally emptied out from the coolers (e.g., by drains or by turning the coolers sideways or upside down) to reduce the weight of the coolers for transporting. Embodiments of the present invention utilize water from coolers (i.e., melted ice), which is generally discarded in a manner that provides little or no benefit, for cooling the environment around a user by misting.

Figure 1:
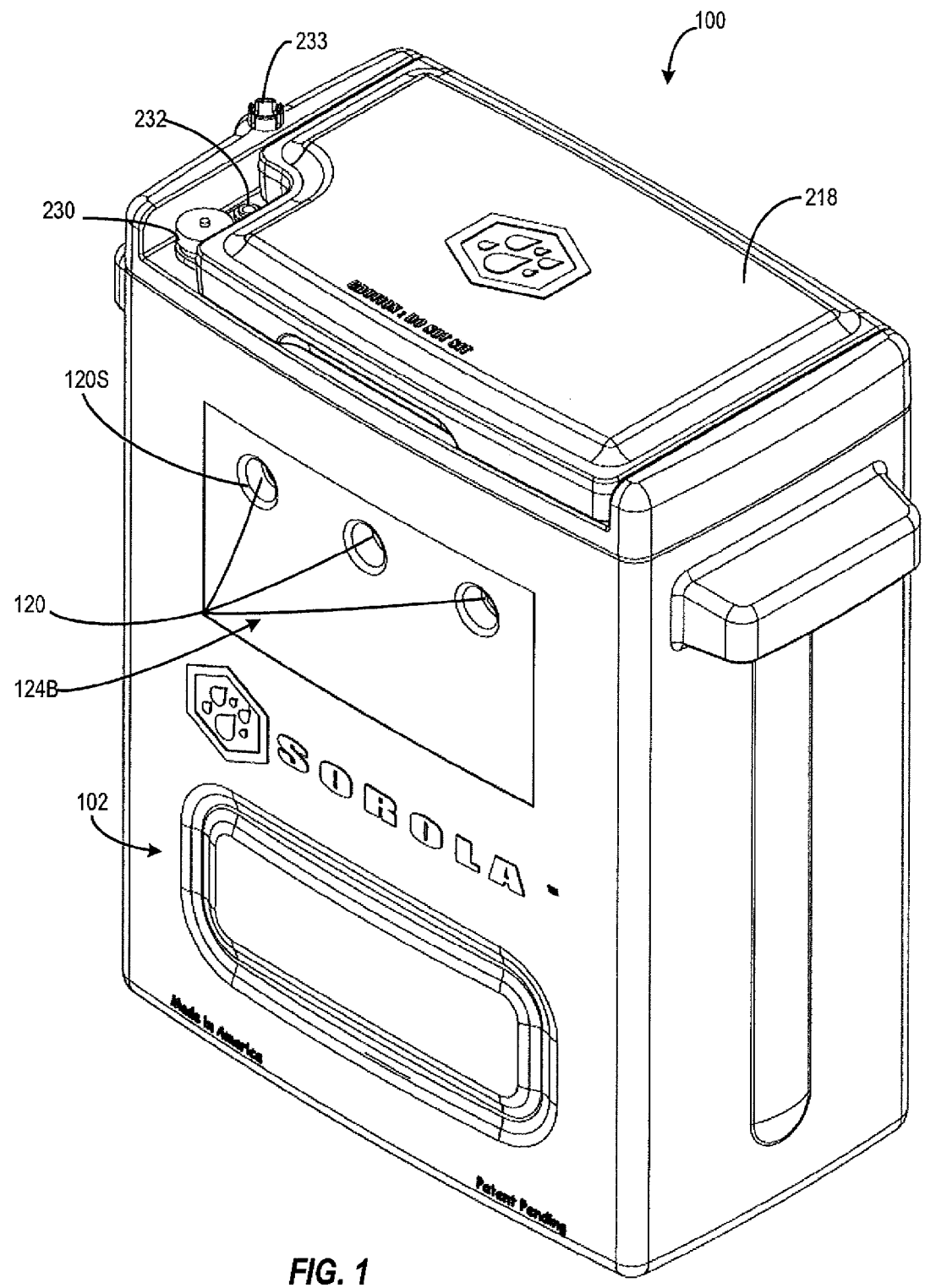
FIG. 1 is a perspective view of a misting beverage system in accordance with one embodiment of the current invention.

Attention is now directed to FIG. 1, which shows one embodiment 100 of a misting beverage system. The misting beverage system 100 comprises an outer shell or housing 102 in which a beverage cooler (or "inner liner") 200 (FIG. 4) and a misting system 300 (FIG. 3) may reside.

Figure 2:
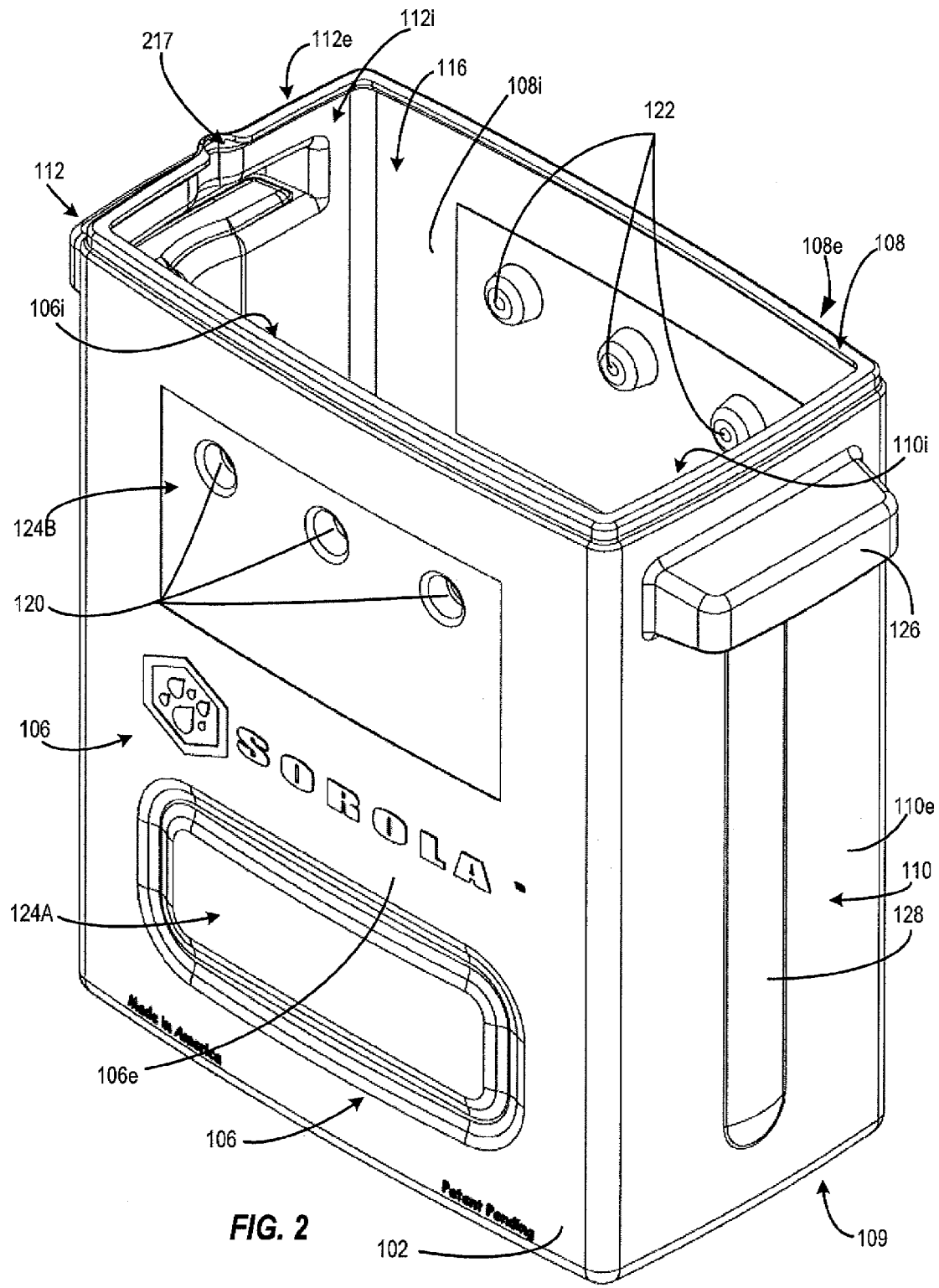
FIG. 2 is a perspective view of the misting beverage system of FIG. 1, with an inner liner removed.

FIG. 2 shows the housing 102 without the inner liner 200. As can be seen, the housing 102 has a front wall 106, a back wall 108, a bottom wall 109, and first and second side walls 110, 112, respectively. The front wall 106 may have an exterior surface 106e and an interior surface 106i; the back wall 108, the bottom wall 109, the first sidewall 110, and the second sidewall 112 may also each have an interior surface 108i, 109i, 110i, 112i and an exterior surface 108e, 109e, 110e, and 112e, respectively. These interior surfaces 106i, 108i, 109i, 110i, 112i of the front wall 106, back wall 108, bottom wall 109, first sidewall 110, and second sidewall 112 collectively define a cavity or chamber 116. The inner liner 200 and the misting system 300 are housed within the chamber 116.

The housing 102 may be made of any durable material(s) and blends, such as polyethylene, polypropylene, nylon, thermoplastic olefin, polyvinyl chloride, or other plastics and/or metals. Three recessed openings 120 may extend from the exterior surface 106e of the front wall 106 of the housing 102 to its interior surface 106i; three recessed openings 120 may also extend from the exterior surface 108e of the back wall 108 to its interior surface 108e. The recessed openings 120 may allow the chamber 116 to be accessed from the exterior surfaces 106e, 108e of the front and back walls 106, 108, respectively. While the front and back walls 106, 108 have been shown in the figures as having three recessed openings 120 each, people of skill in the art will appreciate that a different number of recessed openings 120 may be provided, and that the number of recessed openings 120 in the front wall 106 need not equal the number of recessed openings in the back wall 108. Each recessed opening 120 may have a corresponding nut 122 permanently secured to the interior surfaces 106i, 108i of the front and back walls 106, 108, respectively. The nuts 122 may be internally threaded, or may be otherwise configured to secure stops (e.g., fasteners or snap rivets) that are inserted into the openings 120 from the exterior surfaces 106e, 108e of the front and back walls 106, 108, respectively.

The exterior surface 106e of the front wall 106 may have a first logo placement portion 124A. The first logo placement portion 124A is shown in the figures as being generally rectangular; however, people of skill in the art will appreciate that the first logo placement portion 124A may be of other shapes, and that the exterior surface 108e of the back wall 108 may also (or alternatively) include the first logo placement portion 124A. The first logo placement portion 124A may provide a convenient space for advertising or other indicia. In some embodiments, the first logo placement portion 124A is transparent and may allow users to view the misting system 300 from the outside. Embodiments where the first logo placement portion 124A is absent are also contemplated. The exterior surfaces of the sidewalls 110, 112 may also include strips 128 on which logos (or other indicia) may be placed.

One handle 126 may be secured to each of the exterior surfaces 110e, 112e of the first and second sidewalls 110, 112, respectively (e.g., by being coupled to the sidewalls 110, 112 by appropriate fasteners or by being molded with the sidewalls 110, 112). The handles 126 may be sturdy and ergonomic, and may allow a user to conveniently lift and transport the housing 102.

Figure 4:
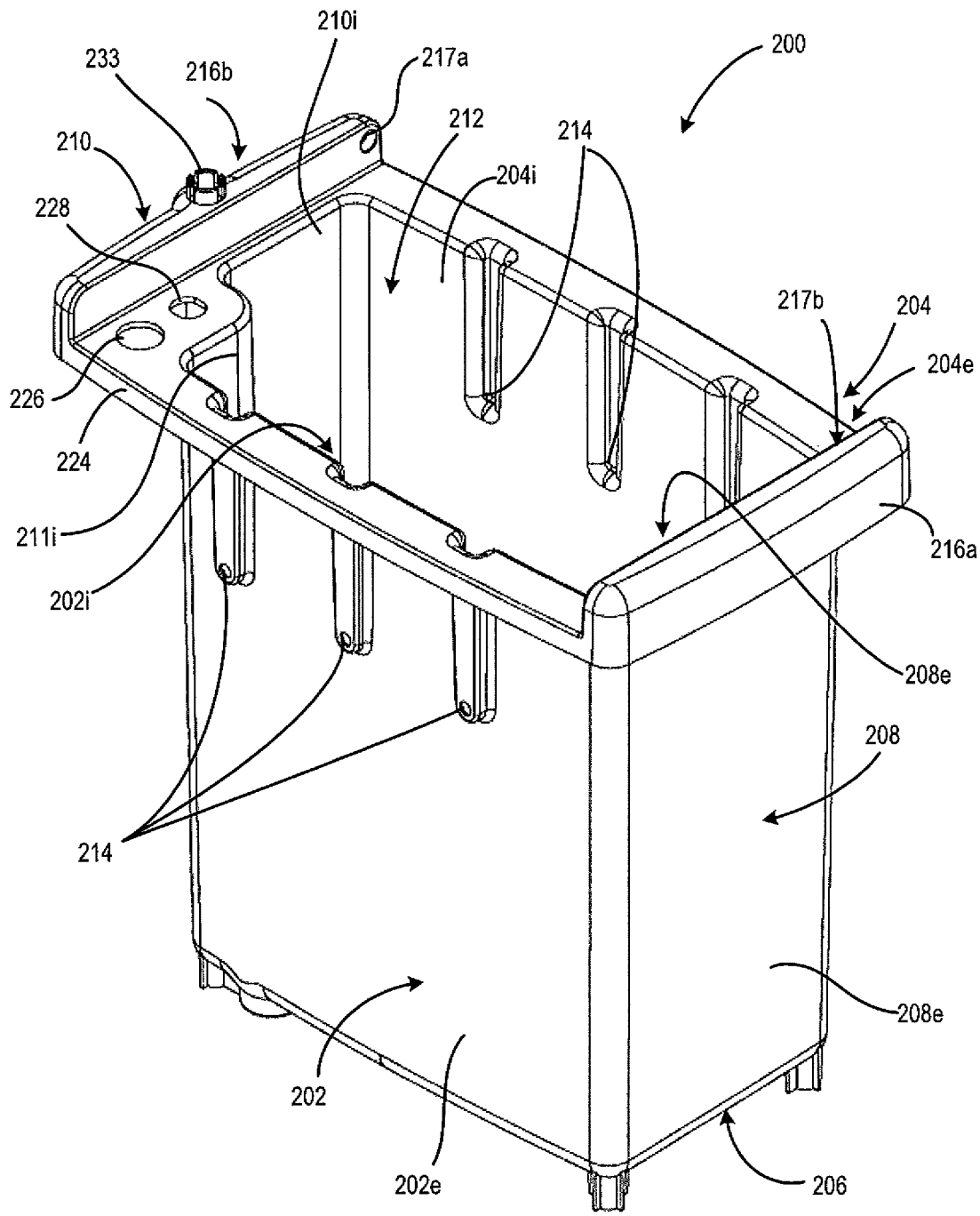
FIG. 4 is a perspective view of an inner liner that has been taken out of the housing of FIG. 3.
Figure 5:
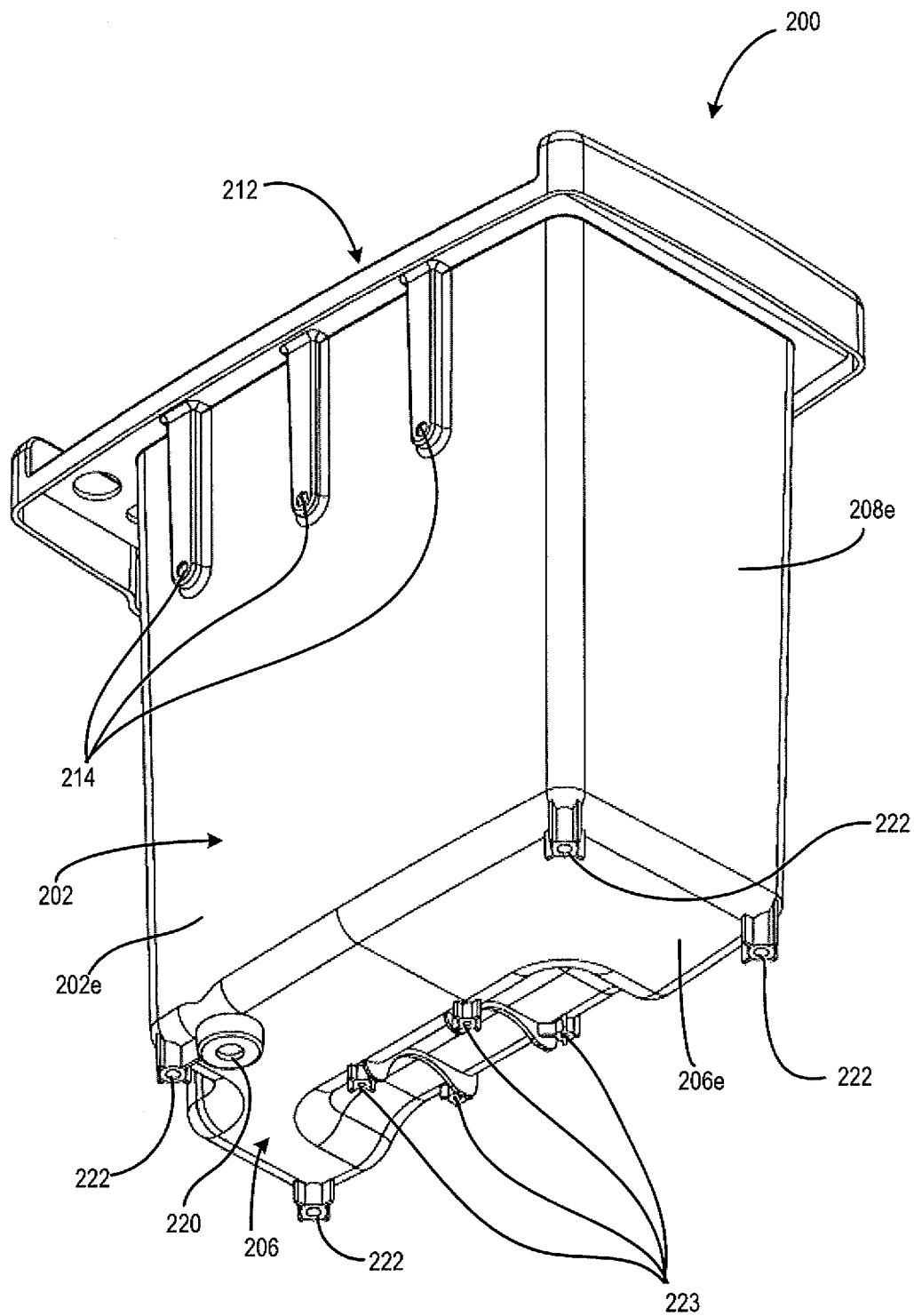
FIG. 5 is another perspective view of the inner liner of FIG. 4.
Figure 6:
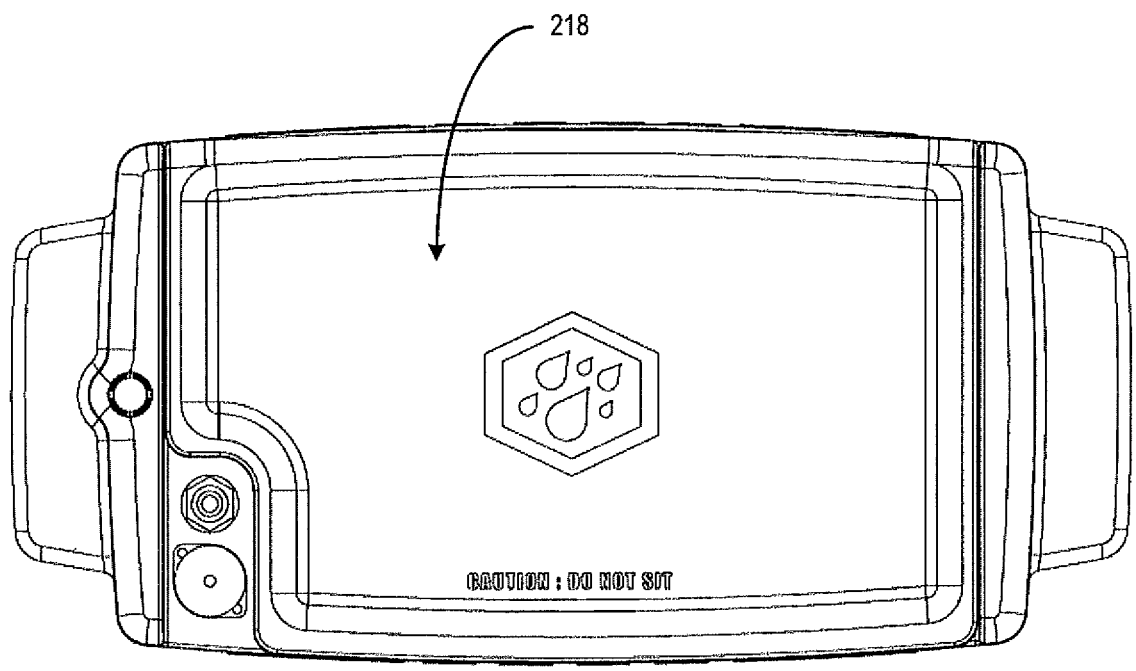
FIG. 6 shows a top view of the misting beverage system of FIG. 1.
Figure 7:
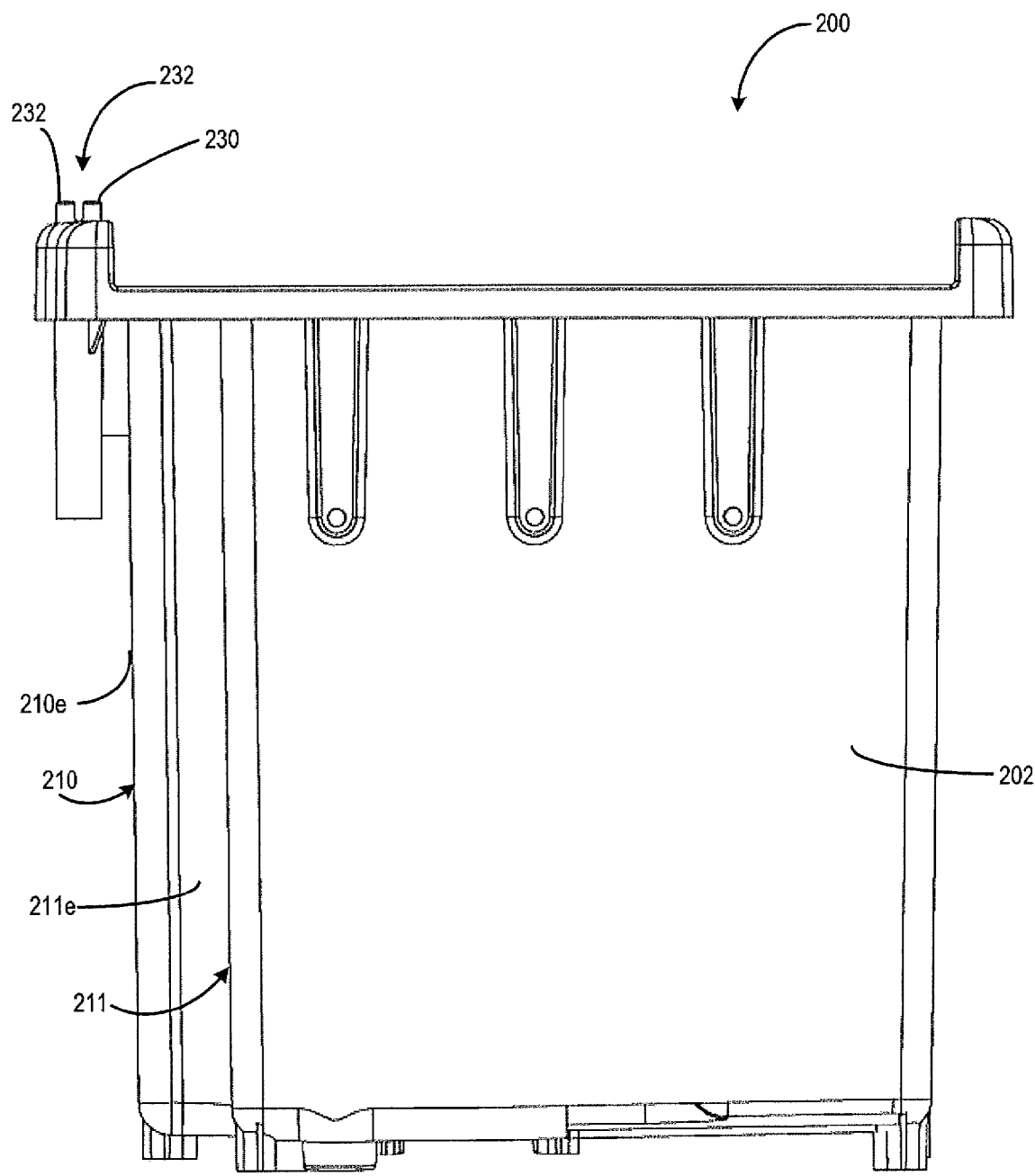
FIG. 7 is a front perspective view of the inner liner of FIG. 4, showing a recessed portion of the inner liner.

Attention is now directed to FIGS. 4 and 5, which show the inner liner 200. In some embodiments, the inner liner 200 is made of the same materials as the housing 102. The inner liner 200 may have a front wall 202, a back wall 204, a bottom wall 206, a first sidewall 208, and a second sidewall 210, with each having exterior surfaces 202e, 204e, 206e, 208e, 210e (see FIG. 7) and interior surfaces 202i, 204i, 206i (not specifically shown), 208i, and 210i, respectively. A recessed portion 211 (see FIG. 7) having an exterior surface 211e and an interior surface 211i (see FIG. 4) may extend between the front wall 202 and the second sidewall 210 of the inner liner 200. The interior surfaces 202i, 204i, 206i, 208i, 210i, and 211i of the front wall 202, back wall 204, bottom wall 206, first sidewall 208, second sidewall 210, and recessed portion 211 may collectively define a beverage retaining cavity 212 within the inner liner 200. The beverage retaining cavity 212 may be substantially insulated (e.g., by placing a hard foam between the exterior and interior surfaces of some or all the walls of the inner liner 200). A user may fill the beverage retaining cavity 212 with ice, beverages (e.g., soda cans, beer bottles, juice boxes, et cetera), food (e.g., ice cream, fruit, et cetera), and/or other items that the user desires to store at a low temperature. A protective cover or lid 218 (see FIG. 6) may be provided to substantially close the beverage retaining cavity 212. The inner liner 200 may include two opposing lid swivel receptacles 217a, 217b (FIG. 4) to which the lid 218 may be secured, and which may allow the lid 218 to be swiveled open. In other embodiments, the lid 218 may be removable.

A first handle or gripping portion 216a may extend outward from the exterior surface 208e of the first sidewall 208, and a second handle or gripping portion 216b may extend outward from the exterior surface 210e of the second sidewall 210. The inner liner 200 may be conveniently handled and transported by using the first and second handles 216a, 216b, respectively.

As can be seen in FIG. 5, the exterior surface 206e of the bottom wall 206 of the inner liner 200 may include a drain 220. The drain 220 may allow liquids in the beverage retaining cavity 212 to be drained out from the cavity 212. The drain 220 may be adjustable (i.e., it may be closed, opened, slightly opened, et cetera) so as to allow the liquids in the beverage retaining cavity 212 to be drained out at varying rates. The exterior surface 206e of the bottom wall 206 may include anchors 222 (e.g., dowels), which, along with the recessed openings 120 as discussed below, allow the inner liner 200 to be anchored within the housing 102. The exterior surface 206e of the bottom wall 206 may also include tabs 223 which allow for securement of a filter to the exterior surface 206e of the bottom wall 206.

Recessed openings 214 may extend from the exterior surface 202e of the front wall 202 of the inner liner 200 to its interior surface 202i; these openings 214 correspond to the openings 120 in the front wall 106 of the housing 102. The openings 214, which may correspond to the openings 120 in the back wall 108 of the housing 102, may similarly extend from the exterior surface 204e of the back wall 204 to its interior surface 204i.

A connecting portion 224 may extend generally horizontally from the top of the recessed portion 211 to the inside of the second handle 216b, and the connecting portion 224 may include a first aperture 226 and a second aperture 228. An electrical controller (or electrical switch or connector) 230 (see FIG. 1) may be housed within the first aperture 226, and a quick connect misting attachment port 232 may be housed within the second opening 228.

Figure 3:
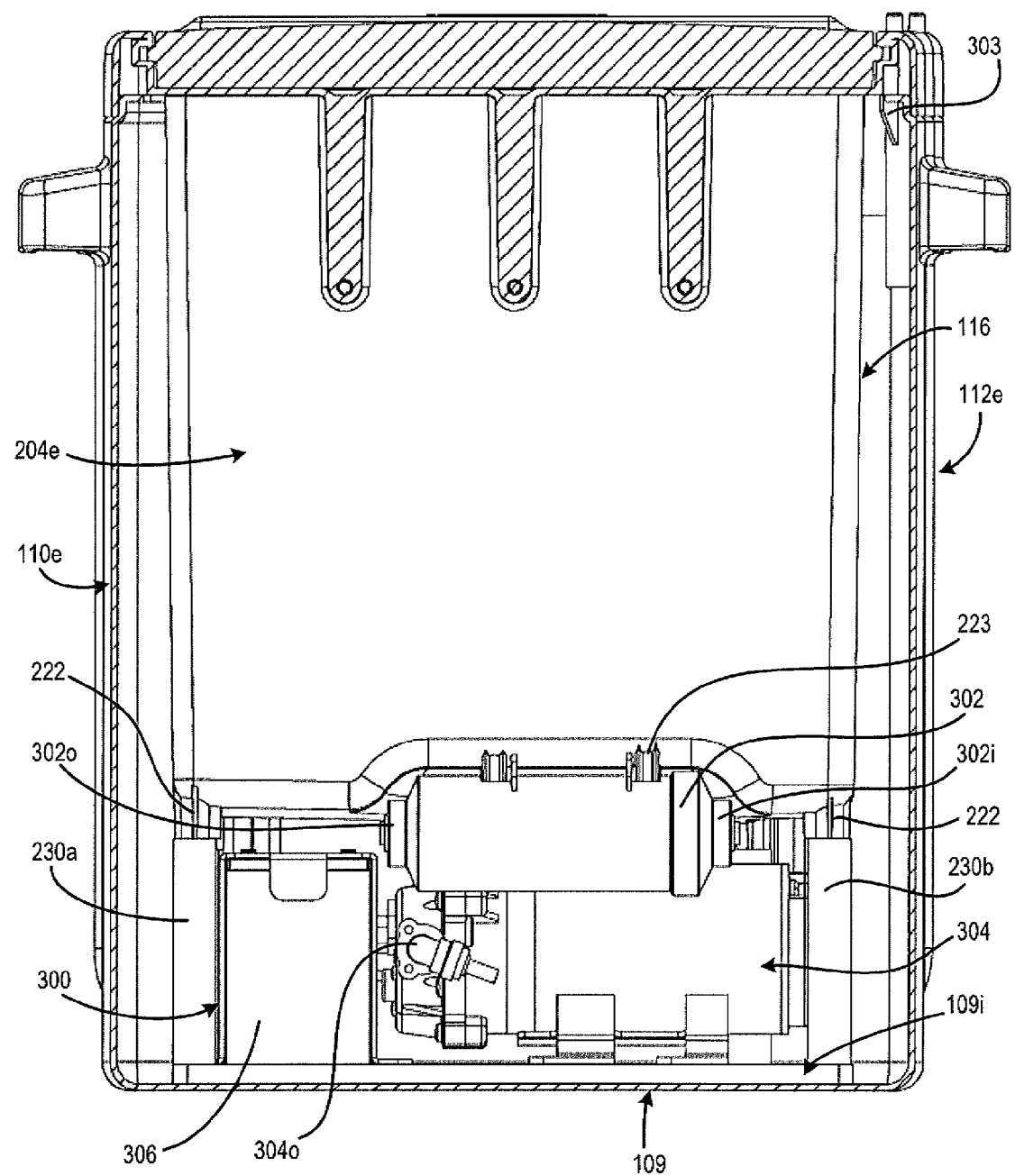
FIG. 3 shows a housing of the misting beverage system of FIG. 1, with its back wall removed to expose a misting system.

Attention is now directed to FIG. 3, which shows the housing 102 with its back wall 108 removed. As can be seen, a first supporting member 230a may be placed on the interior surface 109i of the bottom wall 109 of the housing 102 adjacent the interior surface 110i of the first sidewall 110. The supporting member 230a may span the length of the interior surface 110i of the first sidewall 110. A second supporting member 230b may similarly be placed on the interior surface 109i of the bottom wall 109 of the housing 102 adjacent the interior surface 112e of the second sidewall 112. The second supporting member 230b may span the length of the interior surface 112i of the second sidewall 112. As can be seen, the inner liner 200 may be placed within the chamber 116 of the housing 102 such that the legs 222 of the inner liner 200 are anchored (e.g., doweled) to the support members 230a, 230b, and the exterior surface 204e of the back wall 204 of the inner liner 200 is adjacent the interior surface 108i of the back wall 108 of the housing 102. Other embodiments may use four support members (i.e., one for doweling each leg 222 of the inner liner 200) instead of the two support members 230a, 230b.

Once the inner liner 200 is placed within the chamber 116 in this fashion, each of the three recessed openings 120 in the front wall 106 of the housing 102 correspond to and become adjacent one of the three openings 214 in the front wall 202 of the inner liner 200, and each of the three recessed openings 120 in the back wall 108 of the housing 102 correspond to and become adjacent one of the three recessed openings 214 in the back wall 204 of the inner liner 200. Stops 120s (see FIG. 1), such as fasteners or rivets, may then be inserted into the recessed openings 120 from the exterior surface 106e of the front wall 106 of the housing 102 such that the stops 120s penetrate the openings 214 in the front wall 202 of the inner liner 200. Similarly, stops 120s may be inserted into the recessed openings 120 from the exterior surface 108e of the back wall 108 of the housing 102 such that the stops penetrate the openings 214 in the back wall 204 of the inner liner 200. The stops 120s help ensure secure retention of the inner liner 200 within the housing 102.

In one embodiment, the stops 120s permanently secure the inner liner 200 within the housing 102. Where such permanent securement is desired, a cover or logo may be adhered to one (or both) of the exterior surfaces 106e, 108e of the front and back walls 106, 108 respectively of the housing 102 to cover the stops 120s (e.g., over a second logo placement portion 124b); tampering of the cover or logo on the second logo placement portion 124b may then indicate that a user has attempted to remove the inner liner 200 from the housing 102 by manipulating the stops 120s.

Underneath the inner liner 200, and between the supporting members 230a, 230b in the housing 102, rests the misting system 300 (FIG. 3). The misting system 300 may include a filter 302, a pump 304, and a battery 306.

Figure 8:
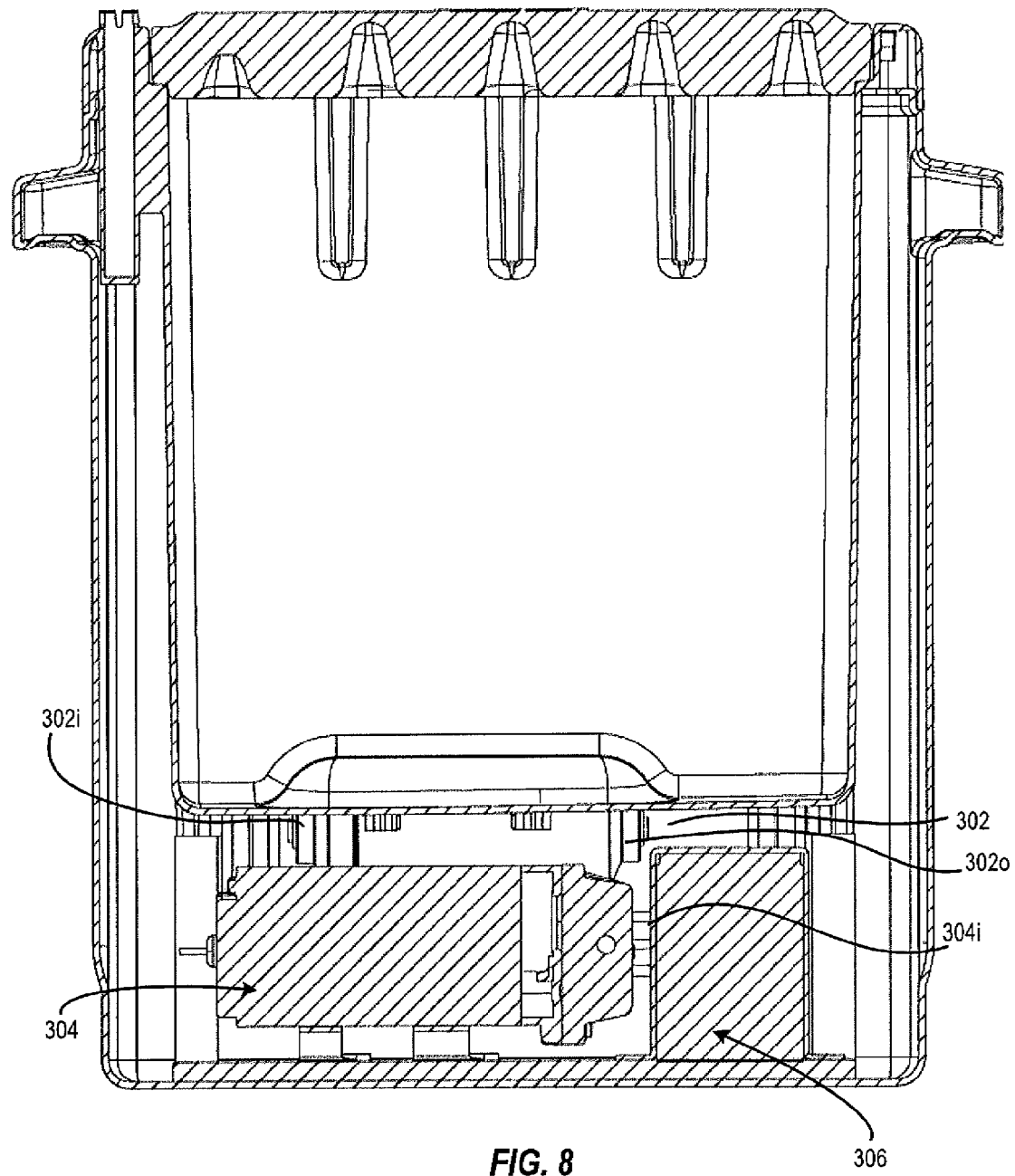
FIG. 8 shows the misting beverage system of FIG. 1 with a front wall of the housing and a front wall of the inner liner removed.
Figure 9:
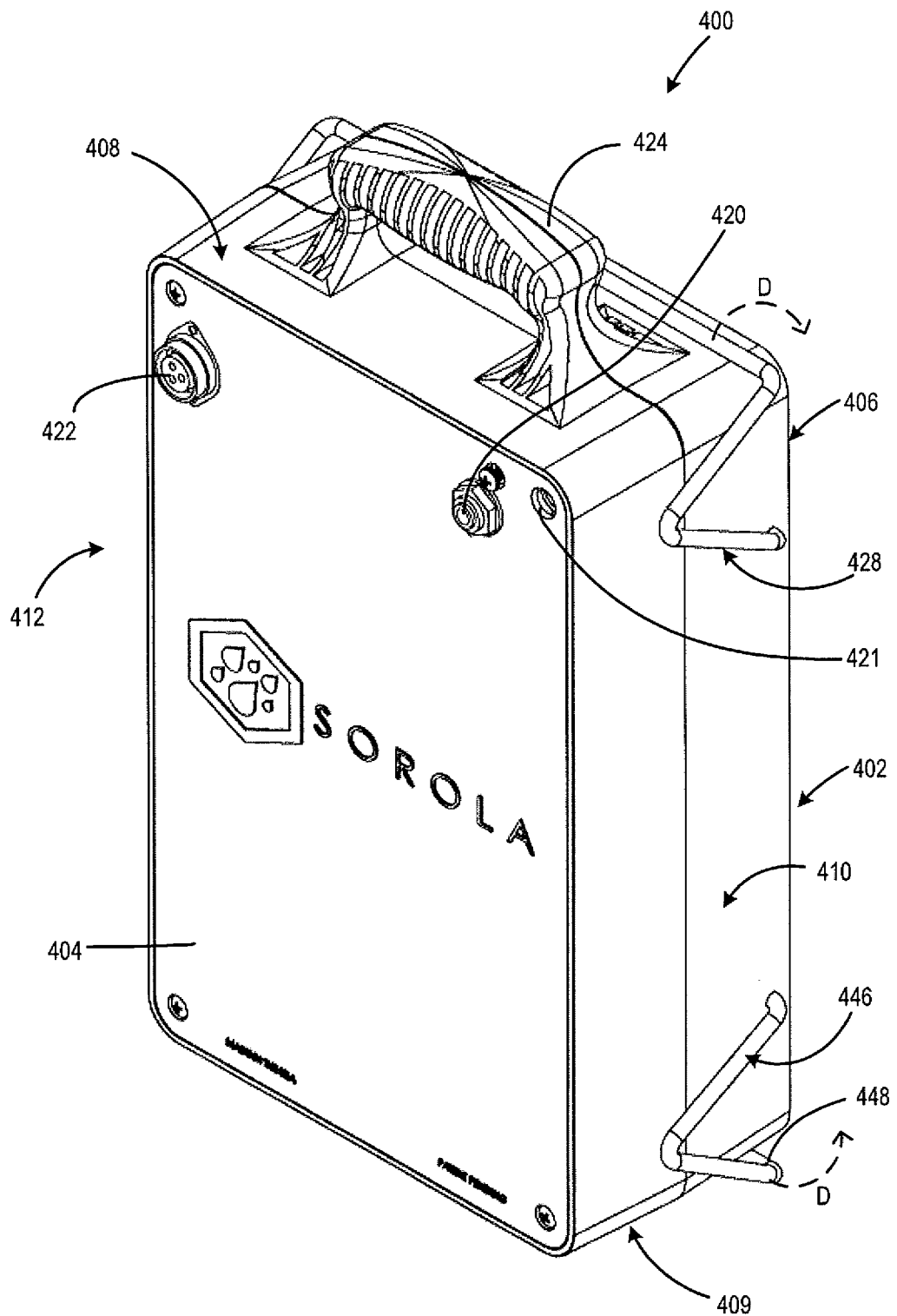
FIG. 9 shows a misting system in accordance with an alternate embodiment of the current invention.

The filter 302 may be secured by the tabs 223 to the exterior surface 206e of the bottom wall 206 of the inner liner 200. The filter 302 may have an input port 302i and an output port 302o. The input port 302i of the filter 302 may be connected via tubing 303 (see FIG. 3), part of which is not shown in the figures for clarity, to the drain 220 of the inner liner 200. The output port 302o of the filter 302 may be connected via the tubing 303 to an input port 304i of the pump 304 (see FIG. 8). The filter 302 may prevent sediments, food particles, hard water, and other undesirable materials from being fed to the pump 304.

A user of the misting beverage system 100 may place food and beverages that he desires to keep at lower temperatures in the beverage retaining cavity 212 of the inner liner 200, along with ice. Eventually, as the ice melts, the spent water may drain out of the drain 220 in the bottom wall 206 of the inner liner 200 into the input port 302i of the filter 302. The filtered water may then be fed from the output port 302o of the filter 302 to the input port 304i of the pump 304.

The pump 304 may have an output port 304o (FIG. 3), and the pump 304 may be configured to force water that is inputted at its input port 304i out the output port 304o at high pressure. Specifically, tubing 303 may be connected to the output port 304o of the pump 304, and the tubing 303 may be routed adjacent the exterior surface 211e of the recessed portion 211 (see FIG. 7) to the quick connect misting attachment port 232 in the inner liner 200. In this way, the pump 304 may direct the water (i.e., spent ice) of the inner liner 200 to the misting attachment port 232 at a high pressure.

Power to operate the pump 304 may be provided by the battery 306 that is electrically coupled to the pump 304. The battery 306 may be rechargeable, and an electrical cable may be routed from the battery (e.g., adjacent the exterior surface 211e of the recessed portion 211) to the electrical controller or switch 230. The switch 230 may allow the pump 304 to be turned on and off for providing misting on demand. The switch 230 may also allow the pump 304 to pump the water up to the quick connect misting attachment port 232 at varying rates. The switch 230 (or a separate attachment thereto) may also include an electrical connector (not specifically shown) into which a charging cable can be inserted to recharge the battery 306 with standard electrical power (e.g., at one hundred and ten or two hundred and twenty volts).

The quick connect misting attachment port 232 may be configured for the quick attachment of a misting member that may spray the water (i.e., the spent ice) that is fed to the misting attachment port 232 by the pump 304 into its surroundings. The fine droplets of water sprayed out the misting member may evaporate before they reach the ground, and in so doing, may cool the surroundings of the misting beverage system 100 by evaporative cooling. The misting member may also be used to create a make-shift fountain for kids to play in, particularly in more humid climates where the air is less conducive to evaporative cooling.

The inner liner 200 of the misting beverage system 100 may also include a telescoping misting mast receiver 233. The second sidewall 112 of the housing 102 may have an opening 117 (FIG. 2) which allows the telescoping misting mast receiver 233 to be accessed from outside the housing 102 while the beverage retaining chamber 212 is closed by the lid 218. The misting mast receiver 233 may allow for a misting mast (not shown in the figures) to be removably coupled to the housing 102. The misting mast may output mist from water (i.e., the spent ice) originating in the inner liner 200 (e.g., via the quick connect misting attachment port 232). The misting mast may have multiple misting nozzles and/or an adjustable height or direction, and provide the misting beverage system 100 with increased versatility.

Thus, as has been described, the highly advantageous misting beverage system 100 allows users to cool their surroundings by evaporative cooling and concurrently keep their food and beverages at lower temperatures. It will be appreciated, however, that the beverage retaining chamber 212 need only be filled with water to effectuate misting.

Attention is now directed to FIGS. 9 through 12, which depict a stand-alone mister 400 according to another embodiment of the current invention. A key difference between the stand-alone mister 400 and the misting beverage system 100 is that the stand-alone mister 400 does not include its own beverage cooler/inner liner; rather, the stand-alone mister 400 is configured to interact with commonly available stand-alone beverage coolers. The mister 400 includes an outer shell or housing 402 having a front wall 404, a back wall 406, a top wall 408, a bottom wall 409, and two sidewalls 410, 412, respectively.

Figure 10:
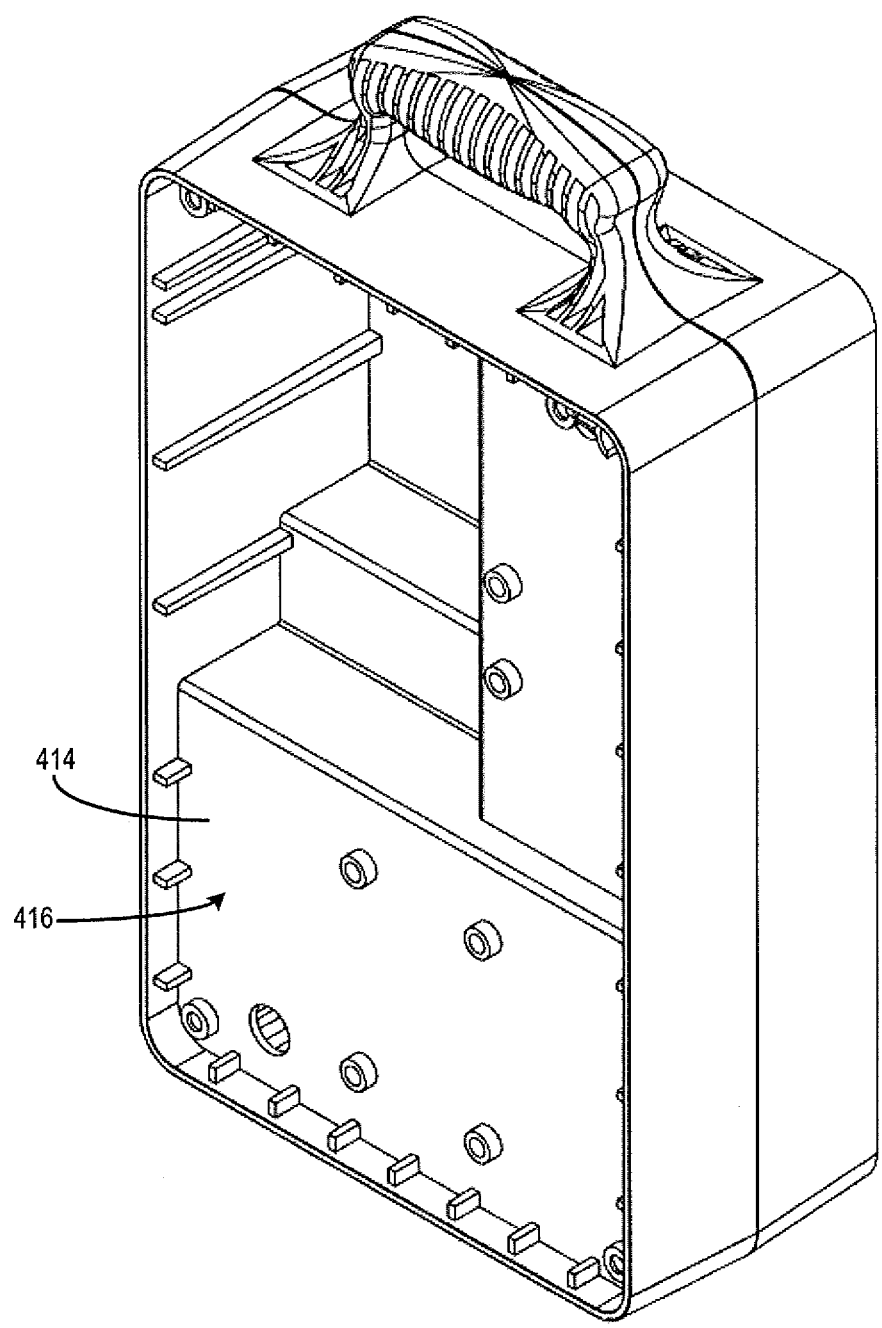
FIG. 10 shows a housing of the misting system of FIG. 9, with its front wall removed.
Figure 11:
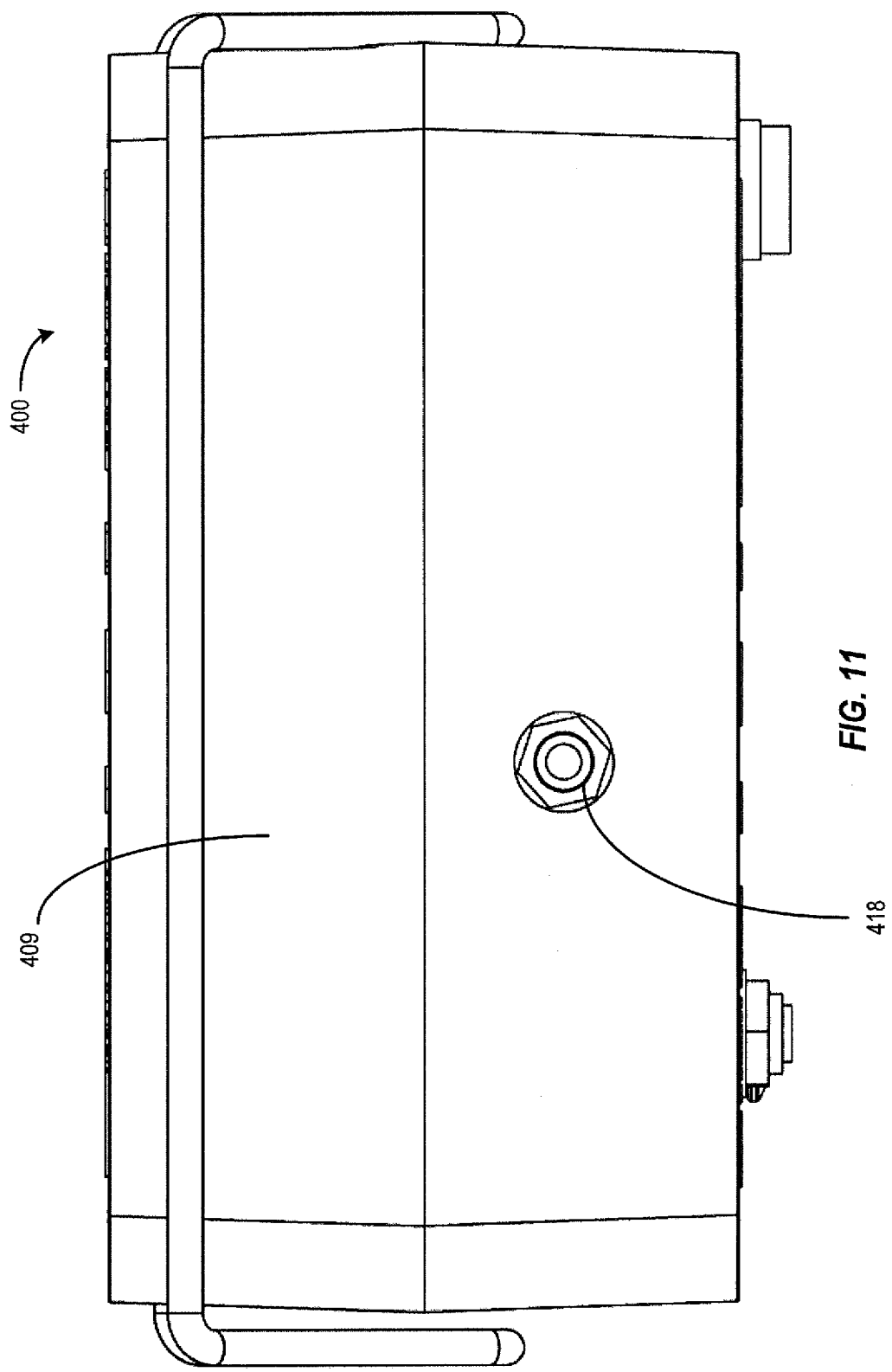
FIG. 11 shows a bottom view of the housing of FIG. 10.

FIG. 10 shows the housing 402 with its front wall 404 removed, exposing a misting system compartment 414. A misting system 416 that may be generally the same as the misting system 300 (e.g., the misting system 400 may also include filter, a pump, and a rechargeable battery) resides in the misting system compartment 414. The bottom wall 409 of the housing 404 may include an inlet or connector 418 (see FIG. 11), and water from coolers (i.e., spent ice) or from other sources (e.g., taps, water bodies, et cetera) may be routed into the inlet 418 by tubing. From there, the water may be filtered and pushed out by the pump towards a misting attachment port 420 (see FIG. 9). The misting attachment port 420, as with port 232 in embodiment 100, may be configured for the attachment of a misting member. An electrical connector or switch 422 may also be provided adjacent the front wall 404 to recharge the battery and to control the misting operations. And similar to embodiment 100, the top wall 408 of the housing 402 may include a gripping portion 424 that is sturdy and ergonomic to allow the mister 400 to be conveniently handled.

Figure 12:
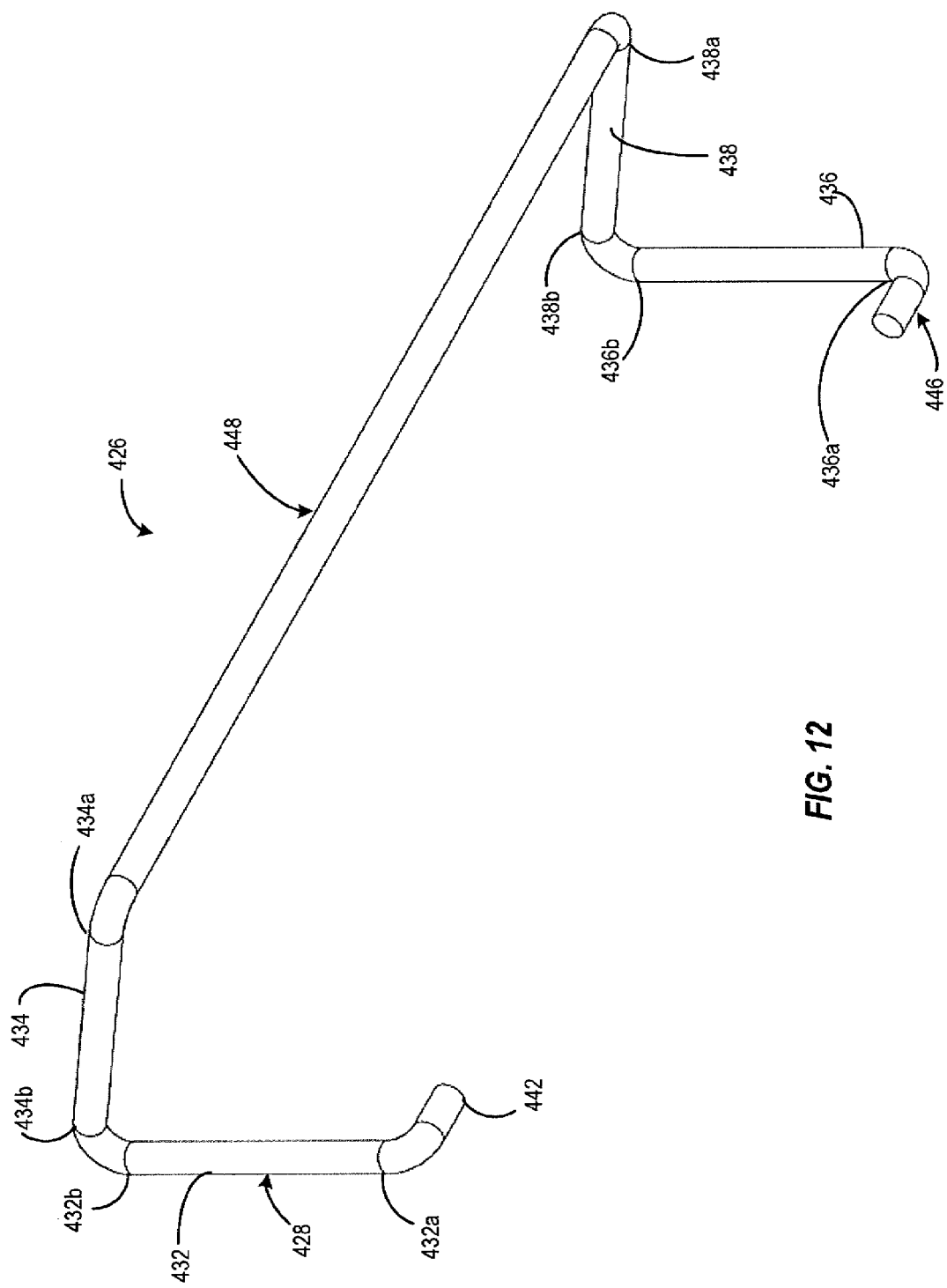
FIG. 12 shows a rotatable support for the housing of FIG. 10.

As shown in FIG. 12, the mister 400 may have a top rotatable support 426. The top rotatable support 426 may include a first V-shaped portion 428 and a second V-shaped portion 430. The first V-shaped portion 428 may comprise a first leg 432 having ends 432a, 432b, and a second leg 434 having ends 434a, 434b. The ends 432b, 434b of legs 432, 434, respectively, may intersect to form the V-shape. The second V-shaped portion 430 may similarly comprise a first leg 436 having ends 436a, 436b, and a second leg 438 having ends 438a, 438b. The ends 436b, 438b of the legs 436, 438 may intersect to form the V-shape. A connecting portion 440 may extend between the end 434a of the second leg 434 of the first V-shaped portion 428 and the end 438a of the second leg 438 of the second V-shaped portion 430. An insertion member 442 may extend from the end 432a of the first leg 432 of the first V-shaped portion 428; an insertion member 444 may similarly extend from the end 436a of the first leg 436 of the second V-shaped portion 430. The top rotatable support 426 may be configured such that in its initial position, the first V-shaped portion 428 is adjacent the first sidewall 410 of the housing 402, the second V-shaped portion 430 is adjacent the second sidewall 412 of the housing 402, and the connecting portion 440 is adjacent the top wall 408 of the housing 402. The first and second sidewalls 410, 412 may each include openings into which the insertion members 442, 444 may be respectively inserted to secure the top rotatable support 426 to the housing 402.

As the inlet 418 of the housing 402 may be located at its bottom wall 409, it may be desirable to rest the housing 402 on its back wall 406 so that the inlet is easily accessible. However, resting the housing 402 on its back wall 406 may cause the housing 402 to get dirty. To avoid this problem, the top rotatable support 426 may be rotated along direction D (see FIG. 9) such that the connecting member 440 becomes adjacent the back wall 406. The housing 402 may also have a bottom rotatable support 446 that is generally similar to the top rotatable support 428 and which has a connecting member 448 adjacent the bottom wall 409 of the housing 409 in its initial position; the bottom rotatable support 446 may be rotated along direction D' to cause the connecting member 448 to also become adjacent the back wall 406 of the housing 402. The housing 402 may then be rested such that its back wall 406 is adjacent but spaced apart from the ground. As will be appreciated, when not in use, the rotatable supports 428, 446 may be rotated back to their original positions.

The front wall 404 of the housing 402 may also include a telescoping misting mast receiver 421. As with the embodiment 100, the misting mast receiver 421 may allow an adjustable misting mast (not shown) to be secured to the housing 402. The rotatable supports 428, 446 may allow the back wall 406 to be adjacent (and spaced from) from the ground to enable the misting mast to extend vertically upwards from the front wall 404.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A misting system utilizing spent ice, the system comprising:
   a portable housing;
   an inner frame secured inside the housing, the inner frame being configured to receive ice and at least one of food and beverage, the inner frame having an outlet for passing melted ice;
   a lid for selectively enclosing the inner frame; and
   a pump inside the portable housing, the pump being in communication with the inner frame outlet and an outlet of the portable housing to pump melted ice from the inner frame to the portable housing outlet for use as mist;
   wherein the inner frame has a front wall with an opening;
   wherein the housing has a front side with an opening that corresponds to the opening in the inner frame front wall; and
   wherein the inner frame is permanently secured within the housing by a fastening member that extends through the opening in the inner frame front wall and the opening in the housing front side.

2. The system of claim 1, further comprising a filter upstream of the pump.

3. The system of claim 1, further comprising a rechargeable battery inside the housing for powering the pump.

4. The system of claim 3, further comprising a filter secured to a bottom side of the inner frame, the melted ice passing through the filter before reaching the pump.

5. The system of claim 1, wherein:
   the housing includes a support member; and
   at least one dowel provides structural support between the inner frame and the housing.

6. The system of claim 1, wherein the housing includes a transparent section whereby the pump is visible from outside the housing.

7. The system of claim 1, further comprising insulation between at least a portion of the inner frame and the housing.

8. The system of claim 1, wherein the lid is removable from the housing and the inner frame.

9. The system of claim 1, wherein the outlet is adjustable to alter a flowrate of the melted ice from the inner frame.

10. The system of claim 1, further comprising a filter upstream of the pump, a rechargeable battery inside the housing for powering the pump, and insulation between at least a portion of the inner frame and the housing.

11. The system of claim 10, wherein the housing includes a transparent section whereby the pump is visible from outside the housing.

12. The system of claim 1, wherein the housing is configured to receive a telescoping misting member.

* * * * *